Figure 1:
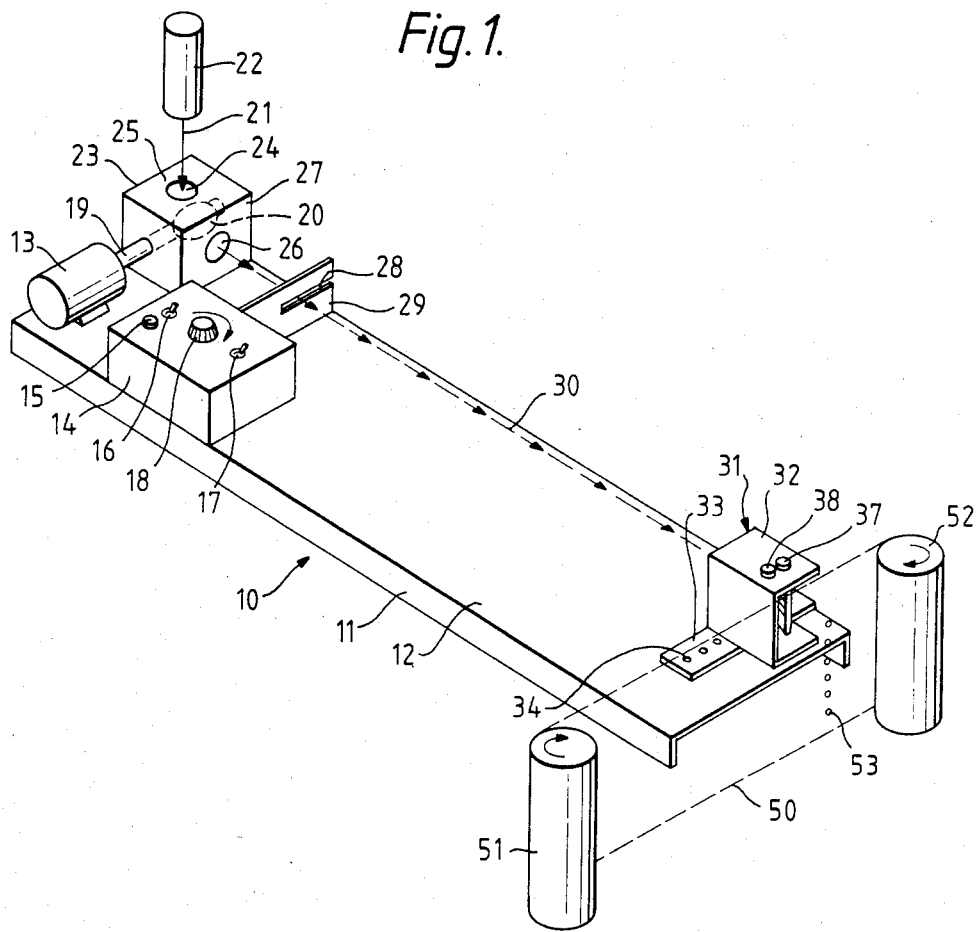

United States Patent [19]

Addleman

[11] Patent Number: 4,553,017

[45] Date of Patent: Nov. 12, 1985

[54] ENERGY BEAM FOCUSING APPARATUS AND METHOD

[75] Inventor: Robert L. Addleman, Harpenden, England

[73] Assignee: Imperial Chemical Industries Limited, London, England

[21] Appl. No.: 490,115

[22] Filed: Apr. 29, 1983

[30] Foreign Application Priority Data

Mar. 14, 1983 [GB] United Kingdom ................. 8306951

[51] Int. Cl.⁴ .............................................. B23K 26/00
[52] U.S. Cl. ........................ 219/121 LA; 219/121 LP; 219/121 LQ; 219/121 LT
[58] Field of Search ................. 219/121 LK, 121 LL, 219/121 LN, 121 LG, 121 LP, 121 LQ, 121 LR, 121 LT, 121 LU; 350/171, 294, 167, 293

[56] References Cited

U.S. PATENT DOCUMENTS

| | | | |
|---|---|---|---|
| 3,931,491 | 1/1976 | Stumpf | 215/121 LG |
| 4,250,372 | 2/1981 | Tani | 219/121 LE |
| 4,297,559 | 10/1981 | Whitman, III | 219/121 LL X |
| 4,315,130 | 2/1982 | Inagaki et al. | 219/121 L |
| 4,378,480 | 3/1983 | Langhans | 215/121 LK |

FOREIGN PATENT DOCUMENTS

| | | |
|---|---|---|
| 0021165 | 6/1980 | European Pat. Off. . |
| 0047604 | 8/1981 | European Pat. Off. . |
| 0080597 | 10/1982 | European Pat. Off. . |
| 2908195 | 3/1979 | Fed. Rep. of Germany . |
| 2022987 | 5/1979 | United Kingdom . |

*Primary Examiner*—C. L. Albritton
*Attorney, Agent, or Firm*—Cushman, Darby & Cushman

[57] ABSTRACT

Apparatus and method for increasing the power density of an energy beam (e.g. a laser beam) by focusing an incident beam to an anisometric configuration and thereafter focusing the anisometric beam to a modified, preferably isometric, configuration. A serrulate reflective surface facilitates the splitting of an incident beam into a plurality of high energy reflected beams, and the technique is of utility in perforating webs, such as polyolefin films.

10 Claims, 4 Drawing Figures

ENERGY BEAM FOCUSING APPARATUS AND METHOD

This invention relates to the production of an energy beam and, in particular, to a method and apparatus for increasing the power density of such a beam.

Techniques for the generation and redirection of energy beams—such as, laser or electron beams, are well known in the art and are of wide utility, especially in cutting and drilling operations. In particular, such techniques are extensively employed in the production of perforated tipping papers for encasing cigarette filters. In one such technique, disclosed in European Patent Publication No. 21165A, an incident optical beam is directed through an optical assembly comprising a plurality of discs mounted for coaxial rotation about an axis substantially parallel to the longitudinal axis of the incident beam. The respective discs are provided with corresponding misaligned sets of peripheral beam transmission apertures and beam reflective elements, the latter being arranged in a non-orthogonal attitude to the rotational axis, whereby, on rotation of the discs, the incident beam is split into a succession of multiple pulsed beams which are redirected from the discs to spaced target areas located on a flat web. By thus chopping the incident beam with a plurality of discs part of the energy content thereof is likely to be lost, and extremely careful manipulation of the system is required to maintain the necessary precise alignment of the equipment components throughout the perforating operation.

It has therefore been proposed, in European Patent Publication No. 47604A, to employ a single chopper disc rotatable about an axis substantially parallel to the longitudinal axis of an incident optical beam, the disc again being provided with a peripheral series of alternating beam-transmission and beam-reflective elements. Rotation of the disc therefore converts the incident beam into two pulsed beams, and a complex mirror arrangement is necessary to subdivide each pulsed beam into the desired number of pulsed beam segments required to effect perforation of a flat sheet of cigarette tipping paper.

To permit the in situ perforation of a cigarette filter tipping wrap it has been proposed, in British patent application GB No. 2 022 987A, to separate spatial segments of an incident optical beam by means of stationary multiple plane reflector facets mounted on a hub unit positioned about the optical axis of the beam. Each beam segment reflected from a hub-mounted facet is then redirected and focused by a counterpart spherical reflective element, internally mounted, on a surrounding stationary support ring, to a target area on the surface of a cigarette filter tip aligned with the optical axis of the incident beam. The disclosed system is of some structural complexity and is suitable only for the surface perforation of articles of a generally tubular shape.

We have now devised a simplified beam handling system which permits an increase in the utilisable power content of an energy beam.

Accordingly, the invention provides an apparatus for increasing the power density of an energy beam comprising means for focusing the beam to an anisometric configuration and means for focusing the anisometric beam to a modified, preferably substantially isometric, configuration.

The invention further provides a method of increasing the power density of an energy beam comprising focusing the beam to an anisometric configuration and thereafter focusing the anisometric beam to a modified, preferably substantially isometric, configuration.

By an "anisometric" beam is meant a beam exhibiting a substantial dimensional inequality in cross-sectional configuration when viewed along, and at a selected position on, the optical, longitudinal axis of the beam. Thus, at a selected position on the optical axis of an anisometric beam, the aspect ratio (width:depth; respectively measured in orthogonal directions in a plane normal to the optical axis, the maximum beam dimension being regarded as the width) of an isophote (a contour line of optical intensity centred on the optical axis) will be greater than unity. An anisometric beam is conveniently generated from an isometric beam by focusing means which operate to reduce only one of the two components (e.g. depth) of the aspect ratio, the other component (e.g. width) remaining substantially constant. The reduction of one component is progressive with distance along the optical axis. Consequently, as the selected position is displaced from the focusing means towards the focal plane of the beam, the isophotic aspect ratio of the beam is progressively increased.

By a "modified" beam is meant a beam in which both components of the aspect ratio have experienced a dimensional reduction. These two-dimensional reductions may be of such magnitude as will yield an "isometric" beam exhibiting substantial dimensional equality in cross-sectional configuration when viewed along the optical, longitudinal axis of the beam.

As herein employed, the aspect ratio is derived from the respective maximum and minimum cross-sectional dimensions of the beam, and it will be appreciated that the beam need not exhibit an absolutely regular cross-section. Some departure from absolute regularity may be tolerated and an anisometric beam may, for example, exhibit a lozenge or sausage-like cross-sectional configuration, while an isometric beam need not be of precisely circular cross-section.

The technique of the invention may be applied to beams of energy capable of being focused as aforesaid, and is particularly applicable to high energy beams of electrons, and optical or light beams, such as those produced by a laser.

The phenomenon of photonic light emission as an atom decays to a lower energy state has been adapted in known laser technology whereby photonic emission is amplified by stimulated emission of radiation. Laser light is substantially monochromatic (photons have the same frequency), is coherent because the emitted photons are in phase, and is intense. The coherence of laser light makes it a suitable medium for producing a sharply defined image in a target area, while the intensity of laser light is such that the laser beam is capable of transmitting sufficient energy to the image to melt or vaporise an image portion of an article, such as a sheet or web, positioned in the target area. Laser beams have therefore been employed in welding, cutting, drilling and perforating operations.

For ease of description the inventive concept is hereinafter described with reference to the use of a laser beam to perforate a web, although it will be appreciated that the invention is of wider applicability and is not restricted to the manipulation of laser beams or the perforation of webs.

The source of the energy beam may be a conventional laser—for example, of the solid type, such as a ruby crystal rod laser which emits a powerful and narrow beam of red light in ultra-short pulses, or of the gaseous type, such as a pulsed or continuous wave $CO_2$ laser, or a helium-neon laser in which the gas mixture is excited by a radio-frequency generator to produce a continuous energy beam. In general, a continuous wave energy beam is preferred.

The power output of a laser is conveniently expressed in watts (W), and the maximum power radiated by commercially available continuous wave lasers is of the order of 1 kW. With a pulsed output, the duration of a pulse being very short, the power output can be very large, although the total energy in the pulse in joules may be very small. For example, an output pulse of 10 nanoseconds (ns) duration and total energy of 1 millijoule ($10^{-3}$ J) corresponds to a mean power of one megawatt (MW). The ability of a laser energy beam to perforate a web depends, inter alia, on the power output of the laser, and for the perforation of a thermoplastic polyolefin film (within a defined range of experimental conditions; P=1 to 25 W; t=0.1 ms to 10 s) we have established the approximate relationship:

$$D = 0.53 \log (P^{2.6} t/1.265),$$

where

D is the diameter (mm) of an approximately circular hole produced in the web,

P is the laser power output (watts), and t is the time (seconds) required to produce the hole.

For example, a hole of 0.25 mm diameter can be punched by a 25 watt laser in 0.87 milliseconds (ms). However, to reduce the hole punching time, we prefer to employ a laser of greater power, for example of 500 watts.

It will be appreciated that the dimensions of a hole produced in a web of material by an incident energy beam also depend on the characteristics of the web. For example, in addition to the removal of material from the target area by vaporisation, there will be a tendency for molten material to retract from the perimeter of the fused area by virtue of the surface tension characteristics of the melt. In the case of an oriented film, the degree of orientation and the relaxation characteristics of the film will also contribute to the creation of a hole of greater cross-sectional area than that of the incident beam.

Perforating performance also depends on the wave length of the emission. For example, hole punching rate may be increased by a factor of 10 if the wave length of the beam is reduced from 10.6 microns ($\mu$m), the wave length of radiation emitted by a carbon dioxide lasing medium, to 10.3 $\mu$m. Desirably, therefore, the beam employed is selected to have a wave length short enough to deliver an adequate supply of energy to the target area.

To focus an energy beam in accordance with the invention an incident energy beam is initially directed onto a first focusing means comprising at least one concave reflective element. Suitably, the, or each, reflective element comprises an arcuate beam-reflective surface of uniaxial curvature, i.e the reflective surface is curved about or relative to a single axis. A particularly convenient uniaxially curved reflective surface is of part-cylindrical configuration. Minor beam focusing errors are likely to result from the adoption of such a simplified geometrical configuration, particularly when allied to the beam scanning technique, as hereinafter described, but these will be compensated by the simplicity of construction and ease of manufacture of a reflective surface of the specified configuration.

By directing an isometric incident energy beam (generally of circular cross-section) onto the concave surface of a part-cylindrical reflective element such that the angle of incidence between the beam and the longitudinal axis of the part-cylinder is approximately 45°, a beam is reflected orthogonally relative to the incident beam and it is observed that the reflected beam is of anisometric configuration. In effect, therefore the cross-sectional configuration of the incident beam has been compressed in one direction while remaining essentially constant in a direction normal thereto to form a modified reflected beam.

The reflected, now anisometric beam is then directed onto a second focusing means comprising a further concave reflective element. The further concave reflective element suitably comprises an arcuate reflective surface of uniaxial curvature, conveniently of part-cylindrical configuration.

By locating the first and second focusing means so that the axes of curvature of the respective concave reflective surfaces are inclined (preferably orthogonally) relative to each other, the anisometric beam reflected from the first focusing means and allowed to impinge upon the second focusing means is reflected therefrom in modified configuration. In effect, the cross-sectional dimension of the incident beam which remains essentially constant on reflection of the beam from the first focusing means is decreased or compressed on reflection of the beam from the second focusing means.

In adapting the system of the invention to perforate a material in sheet or web form, it is desirable to split the incident beam into a plurality of emergent focused beams to facilitate the production of an effective row column matrix pattern of perforations in the material. Preferably therefore, the first focusing means comprises a plurality of concave reflective elements. A convenient reflective assembly comprises a plurality of concave elements each of uniaxial curvature arranged so that the axes of the respective elements are substantially parallel to each other and are (preferably) located in a common plane. A preferred first focusing means therefore comprises a serrulate reflective surface having a plurality of aligned, contiguous, concave grooves. A side elevation of such a surface, i.e. when viewed in a direction parallel to the axis of curvature of any one of the aligned grooves, is of scalloped appearance, and for convenience each of the grooves in a multiply-reflective first focusing means is hereinafter referred to as a "scallop".

The cross-sectional configuration of a scallop, i.e. when viewed parallel to the axis of curvature, may vary in accordance with the focusing requirements of the system, but is conveniently such that the radius of curvature of the scallop (R) and the notional chord (C) extending between the extremes of the arcuate surface are in a ratio (R:C) of from 500:1 to 5:1, preferably from 75:1 to 5:1. For example, a scallop may comprise an arcuate surface having a radius of curvature of 150 mm and a width (i.e. chord length) of 3 mm, whereby R:C=50:1.

In a system according to the invention the dimensions of a scallop relative to the cross-sectional area of the incident beam may be such that the unfocused beam simultaneously impinges upon the reflective surfaces of a plurality of scallops. For example, a typical isometric energy beam produced by a 400 Watt carbon dioxide laser may have a diameter of the order of 18 mm. Such a beam incident upon a multiply-reflective first focusing means, as hereindescribed, wherein each scallop has a notional chord length of 3 mm, will simultaneously impinge upon the surfaces of six contiguous scallops. From each scallop a single beam will be reflected. Effectively therefore the unfocused incident isometric beam is readily split into a plurality (six) of anisometric beams. As hereinbefore described, the resultant anisometric beams may be directed simultaneously upon the single concave reflective surface of a second focusing means to produce a plurality of emergent modified, preferably isometric, beams directed at a target area on a web or sheet material to effect multiple-perforation thereof.

An effective increase in the number of emergent beams derived from a single incident beam may be effected by scanning the incident beam in turn across the reflective surface of each of a plurality of scallops. A suitable scanning assembly comprises a mirror or reflector, conveniently of planar configuration, the mirror being reflectively located in, and mounted for inclination about an axis substantially normal to, the path of the incident beam. Inclination, or rotation, of the mirror therefore causes the reflected beam, derived from the incident beam, to traverse the surface of an object, for example—a first focusing means, placed in the reflective path. An effective increase in the speed of scanning may be achieved, if desired, by employing a polygonal mirror comprising a plurality of (planar) reflective facets mounted for rotation about an axis substantially normal to the path of the incident beam.

Rotation of the scanning mirror is conveniently effected by means of a prime mover, such as an electrical motor, allied, if necessary, to a suitable gear train to provide the desired rotational speed. The latter is readily established by simple experimentation and will depend, inter alia, on the energy density of the reflected beam directed at the target area on the web or sheet. Thus, the scanning speed should be such as will permit the reflected beam an adequate dwell time in the target area to vaporise the required volume of the sheet or web. Factors other than the energy density of the beam, for example—the material of the web or sheet, will influence performance, but by way of example, effective perforation of a polypropylene web of 25 $\mu$m thickness has been achieved in accordance with the invention using a 500 W laser beam scanning across the scalloped surface of a first focusing means at a linear speed of from about 0.2 to 10.0 meters/second. Such quoted speeds are provided by way of example only, and are not to be construed as limiting the scope of the invention.

When an isometric incident beam, as hereinbefore described, falls simultaneously upon a plurality of scallops, the available beam energy is distributed among the plurality of emergent anisometric beams. Dilution of the energy density of the beam therefore occurs. However, improved perforating performance may be achieved by focusing the incident beam so that the latter simultaneously falls upon relatively few scallops, and preferably upon a single scallop. Emergent beams of increased energy density are thereby achieved. Focusing of the incident beam may be effected by beam focusing means, such as a lens assembly.

Perforating performance may also be improved by ensuring that the various beam deflecting and reflecting surfaces are maintained in a highly reflective condition to diminish power losses as the energy beam is successively reflected to the target area. Gold-plated reflectors are particularly suitable.

Performance may also be improved by positioning adjacent, and preferably in intimate contact with, the surface of the workpiece (web or sheet) remote from the energy beam, an element of an energy absorbent or reflective material, whereby energy passing through the workpiece is absorbed or reflected by the element and thereby transmitted back into the workpiece. An absorbent material desirably has a high coefficient of absorption for the wave length of the energy beam, a low thermal diffusivity and good resistance to thermal shock. Suitable materials include siliceous refractory materials, such as fused silica or quartz, or glass ceramic materials. Suitable reflective materials include metals, such as aluminium and gold.

The beam focusing technique of the invention is applicable to a wide range of operations, including drilling, cutting and welding, and is of particular utility in perforating thermoplastics polymeric films.

Accordingly, the invention provides an apparatus (and method) for perforating a web, as herein described, comprising means for supplying a web to a location at or adjacent the focal point of the, or each, modified beam.

Films suitable for treatment according to the invention include thermoplastics polymeric films, and particularly those polyolefin films fabricated from a polymer of an alpha-mono-olefin the molecule of which contains from 2 to 6 carbon atoms, such as ethylene, propylene, butene-1, 4-methylpentene-1, and hexene-1. Copolymers of two or more of these olefins may also be employed, a typical oriented packaging film being formed from a substantially crystalline propylene homo- or block co-polymer, the latter containing, for example, up to 20% by weight of the copolymer of another copolymerisable alpha-olefin such as ethylene or butene-1. In particular, the film may comprise a polyolefin substrate having on at least one surface thereof a layer of a polymeric heat-sealable material a substantial proportion of which melts at a temperature below the melting temperature of the substrate polyolefin. Suitable heat-sealable materials include olefin copolymers such as a propylene-butene-1 random copolymer, containing up to about 20% by weight of butene-1, as described in British Pat. No. 1 452 424, or a blend thereof with a butene-1 homo- or co-polymer, as described in British Pat. No. 1 495 776. Other propylene-rich polymers which may be employed as the heat-sealable material include a random propylene-ethylene copolymer containing up to 10 weight % of ethylene and a random propylene-ethylene-butene-1 terpolymer containing not more than 10 weight % of each of ethylene and butene-1. Ethylene-higher olefin (e.g. propylene or butene-1) copolymers, particularly those containing not more than 15 weight % of the higher olefin comonomer, may also be employed, as may be non-olefinic heat-sealable materials, such as a vinylidene chloride-acrylonitrile copolymer.

The thickness of the treated films may vary depending on the intended application, but usually films having a total thickness of from 2 to 150 microns are of general utility. Films intended for use as packaging films are generally within a thickness range from 10 to 50 microns.

Figure 2:
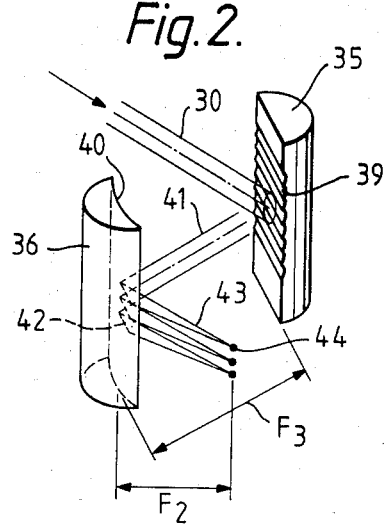
Figure 3:
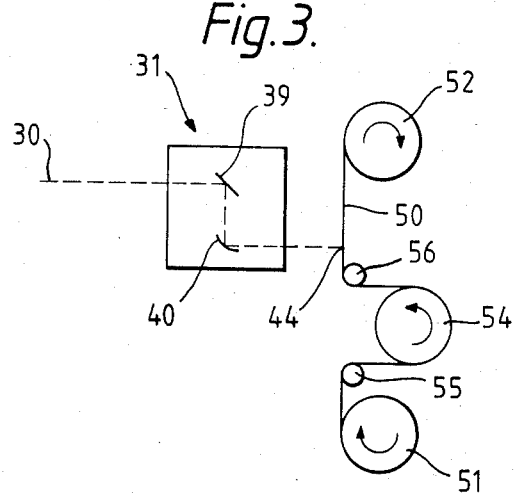
Figure 4:
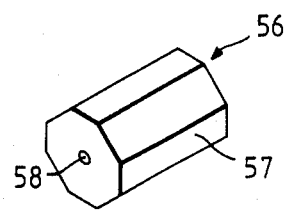

The invention is illustrated by reference to the accompanying drawings in which:

FIG. 1 is a schematic perspective view of a laser focusing assembly arranged to perforate a polymeric packaging film, FIG. 2 is an enlarged detail of the focusing components of FIG. 1, FIG. 3 is a schematic plan view of an alternative film-handling assembly, and FIG. 4 is a schematic perspective view of a polygonal beam-reflecting mirror.

Referring to FIG. 1 of the drawings, a beam-focusing assembly, generally designated 10, comprises a rigid base plate 11, suitably fabricated from aluminium and covered with a layer (not shown) of a matt material to prevent unwanted reflections of the beam. A suitable matt material is a clay-like mineral, particularly a kaolin felt, such as "Kaowool".

Mounted on the operating surface 12 of base plate 11 are an electric motor 13 and associated electronic motor control panel 14 with power warning light 15, switches 16 (on-off) and 17 (direction selector) and motor speed control knob 18.

Motor drive shaft 19, arranged substantially parallel to operating surface 12, supports a planar mirror 20 in the path of a laser beam 21 generated by a laser assembly 22.

Mirror 20 is located in an aluminium shroud 23 having a beam inlet aperture 24 in the uppermost face 25 thereof, and a beam exit aperture 26 in side face 27. Beam 21 entering aperture 24 is thereby reflected by mirror 20, emerges from aperture 26 and subsequently passes through a slit 28 in a graphite collimating screen 29 which ensures that a collimated beam 30 emerges over a relatively small angular sector (e.g. of the order of 2.5°).

The collimated beam 30 (broken arrow representation) is thus directed towards a focusing unit, generally designated 31, comprising a support frame 32 mounted on a locating plate 33 secured to base plate 11. Frame 32 is capable of lateral adjustment relative to base plate 11 by means of pegs (not shown) positioned for engagement in mating orifices 34 in plate 33.

The focusing unit also comprises a first focusing means in the form of a reflective element 35 and second focusing means in the form of a reflective element 36 (see also FIG. 2) mounted in support frame 32 and rotatable about an axis normal to operating surface 12 by respective control knobs 37,38.

Element 35 comprises a plurality of arcuate reflective grooves or scallops 39, each groove being uniaxially curved about an axis substantially parallel to operating surface 12.

Element 36 comprises a single arcuate reflective surface 40 uniaxially curved about an axis substantially normal to operating surface 12.

As depicted in FIG. 2, the collimated laser beam 30 incident upon element 35 is of substantially circular cross-sectional configuration (i.e. isometric) and is of such dimensions that it extends over a plurality of scallops 39 (three, as drawn). That portion of the incident beam falling on each scallop is orthogonally reflected as a modified anisometric beam 41 to yield a substantially linear image 42 on arcuate surface 40, from which each anisometric beam is orthogonally reflected as a modified beam 43 to form a point image 44 at the coincident focal point.

It will be evident that by activating motor 13 to rotate mirror 20, incident collimated beam 30 will scan in a substantially vertical plane over the surface of successive reflective scallops 39 thereby generating a succession of pulsed beam point images in the focal plane of the beam.

Referring again to FIG. 1, (from which the final components of the multiply-reflected beam are omitted, for clarity) a transparent thermoplastics polymeric film 50 is fed from a supply roll 51 to a take-up roll 52 so that the film travels through, or in the vicinity of, the focal plane of the multiply-reflected beam. Each pass of the beam over the scalloped surface of element 35 therefore produces a series of point images 53 on the film and, if the beam intensity is sufficient, each point image will perforate the film. Allowing for the relative movements of the beam and film in relative orthogonal planes, each line of perforations will be slightly inclined to the vertical and, as repeated vertical beam scanning and horizontal film movement occurs, a two-dimensional matrix of perforations will be generated in the film (although only one line of perforations is shown, for clarity).

If incident laser beam 30 is considered as a parallel beam, the focal length $F_2$ of the second reflective element 36 will be the distance from the face of that element to the film path (FIG. 2), while the effective focal length $F_1$ of the first reflective element 35 will be $(F_2+F_3)$, where $F_3$ is the separation between the reflective faces of elements 35 and 36. Thus, by adjusting the distance $F_3$ between elements 35 and 36, the relative F numbers can be altered, thereby altering the shape of the spot image (and thus of the perforation) generated at the film. The image shape may also be altered by changing the dimensions of the laser beam, i.e. the effective aperture in the $F_2$ direction.

In principle, the size of the point image generated at the film is defined by the aperture of the optical system, although a reduction in point image size also entails an effective reduction in the depth of focus of the beam.

In the alternative film-handling assembly shown in FIG. 3 a rubber-covered drive roll 54 is employed to transfer film 50 from supply roll 51, which incorporates a clutch (not shown) to control film tension, to take-up roll 52, the film being maintained in a precisely defined path at or adjacent the focal plane of the beam by means of rigid guide bars 55, 56.

If desired, the scanning speed of the laser beam may be increased by replacing planar mirror 20 by a polygonal mirror. A suitable design of octagonal mirror 56 is shown in FIG. 4, each of the reflective facets 57 being introduced in turn into the path of the laser beam by rotation of mirror 56 about its axis 58.

The invention is further illustrated by reference to the following Examples.

EXAMPLES 1 TO 3

Using an apparatus of the kind depicted in FIG. 1, the isometric output beam 21 from a 400 Watt continuous wave $CO_2$ laser was intermittently reflected by rotating planar mirror 20 to engage a plurality of scallops on a copper reflective element 35 located some 1100 mm from mirror 20. Each scallop had a radius of curvature of 150 mm and a width (i.e. normal to operating surface 12) of 3 mm. The incident beam was thus deflected through 90° and reflected as a plurality of anisometric beams incident upon uniaxially curved reflective element 36 which had a radius of curvature of 75 mm. These beams were then deflected through a further 90° by copper reflective element 36 and reflected as a plurality of substantially isometric beams to a focus in the path of a biaxially oriented propylene homopolymer film of 25 μm thickness fed from supply roll 51 to take-up roll 52.

Motor 13 was activated to rotate mirror 20 at low speeds, e.g. down to 1 rpm which was equivalent to a beam scanning speed of 0.115 ms$^{-1}$ over the surface of a scallop. At that speed, the time for the beam to traverse the width (3 mm) of each scallop was therefore 26 ms.

Examples of experimental conditions under which perforation of the film was effected are provided in the following Table.

TABLE

| Example | Motor speed (rpm) | Beam Traverse Speed (ms$^{-1}$) | Time to scan scallop (ms) | Perforation size Width (mm) | Length (mm) | Area (mm$^2$) | Energy (kJ cc$^{-1}$) |
|---|---|---|---|---|---|---|---|
| 1 | 6.1 | 0.71 | 4.3 | 1.5 | 2.0 | 3.0 | 11.5 |
| 2 | 12.5 | 1.44 | 2.1 | 0.34 | 1.67 | 0.57 | 29.0 |
| 3 | 12.5 | 1.44 | 2.1 | 0.22 | 1.0 | 0.22 | 76.0 |

In Examples 1 and 2 a reflective surface, in the form of an aluminium plate, was positioned adjacent the surface of the film remote from that on which the laser beam impinged to reflect the beam back onto the film. Microscopic examination of the film established the presence of clean perforations therein.

In Example 3, the aluminium reflective surface was not present. The film was observed to have perforations surrounded by a polymeric rim or bead within which residual fragments of film were present. In the absence of the aluminium reflector a significant deterioration in perforating efficiency was experienced, as indicated by the increased energy requirements, calculated by reference to the power content of the beam impinging on the film (measured by a calorific technique), contact time and volume of film removed in forming the perforations.

I claim:

1. An apparatus for increasing the power density of an energy beam said apparatus comprising first means for focusing the beam to an anisometric configuration and second means for focusing the anisometric beam to a modified, preferably substantially isometric, configuration.

2. An apparatus according to claim 1 wherein the first focusing means comprises a first concave reflective element uniaxially curved about an axis of curvature and the second focusing means comprises a second concave reflective element uniaxially curved about an axis of curvature, the axes of curvature of the first and second concave elements being relatively, preferably orthogonally, inclined.

3. An apparatus according to claim 1 wherein the first focusing means comprises a serrulate reflective surface having a plurality of concave, uniaxially curved elements aligned with their axes of curvature in substantially parallel relationship.

4. An apparatus according to claim 3 including beam scanning means to traverse the beam over each reflective element of the first focusing means.

5. An apparatus according to claim 1 for perforating a web comprising means for supplying a web to a location at or adjacent the focal point of the modified beam.

6. An apparatus according to claim 5 comprising a beam reflective element reflectively located adjacent, and preferably in intimate contact with, the surface of the web remote from the energy beam.

7. A method of increasing the power density of an energy beam comprising focusing the beam to an anisometric configuration and thereafter focusing the anisometric beam to a modified, preferably substantially isometric, configuration.

8. A method according to claim 7 comprising focusing the beam to form a plurality of beams each of anisometric configuration and thereafter focusing each anisometric beam to a modified configuration.

9. A method according to claim 7 comprising supplying a web to a location at or adjacent the focal point of the modified beam thereby to perforate the web.

10. A method according claim 7 wherein the beam is a laser beam.

* * * * *